United States Patent [19]

Okamoto

[11] Patent Number: 4,796,297
[45] Date of Patent: Jan. 3, 1989

[54] DEVICE FOR CALCULATING A CHARGE FOR A CHARGED INFORMATION SIGNAL WITH ERRORS AVOIDED IN A REPORT OF THE CHARGE

[75] Inventor: Eiji Okamoto, Tokyo, Japan
[73] Assignee: NEC Corporation, Tokyo, Japan
[21] Appl. No.: 641,111
[22] Filed: Aug. 15, 1984

[30] Foreign Application Priority Data

Aug. 19, 1983 [JP] Japan ................................ 58-152350
Oct. 11, 1983 [JP] Japan ................................ 58-189519

[51] Int. Cl.⁴ ............................................... H04L 9/04
[52] U.S. Cl. ...................................... 380/10; 380/16; 380/25; 380/44
[58] Field of Search ................. 358/84, 115, 114, 122, 358/86; 235/382; 380/16, 25, 10, 20, 44

[56] References Cited

U.S. PATENT DOCUMENTS

| | | | |
|---|---|---|---|
| 3,470,309 | 9/1969 | Nyberg .................................. | 380/16 |
| 3,890,461 | 6/1975 | Vogelman et al. ................. | 358/115 |
| 4,008,369 | 2/1977 | Theurer et al. ....................... | 358/84 |
| 4,225,884 | 9/1980 | Block et al. ............................ | 358/84 |
| 4,302,810 | 11/1981 | Bouricius et al. ................. | 178/22.08 |
| 4,326,098 | 4/1982 | Bouricius et al. ..................... | 380/25 |
| 4,358,672 | 11/1982 | Hyatt et al. ......................... | 235/382 |
| 4,484,217 | 11/1984 | Block et al. ......................... | 358/114 |
| 4,528,588 | 7/1985 | Löfberg ............................... | 380/20 |
| 4,599,647 | 7/1986 | George et al. ......................... | 380/20 |

*Primary Examiner*—Salvatore Cangialosi
*Attorney, Agent, or Firm*—Sughrue, Mion, Zinn, Macpeak, and Seas

[57] ABSTRACT

The amount of money which should be charged upon reception of a pay television signal or a like information signal, is calculated by a charging device comprising a calculator (25) for calculating the amount of charge and an encoder (28) for encoding the charge and time instant (date) using by a key code specific to the charging device to form a check code which should be reported together with the charge. The date data may be indicated either by a timepiece (26) or by a time signal multiplexed on the information signal. Cost information used in the calculator may be multiplexed on the information signal. Alternatively and preferably, the cost information is represented by a scrambling key used in providing the information signal.

11 Claims, 10 Drawing Sheets

DEVICE FOR CALCULATING A CHARGE FOR A CHARGED INFORMATION SIGNAL WITH ERRORS AVOIDED IN A REPORT OF THE CHARGE

BACKGROUND OF THE INVENTION

This invention relates to a device for calculating an amount of money or charge which a subscriber should pay for reception of a pay television signal or a like information signal.

The invention will be described in connection with a pay television network, which may be either of the broadcast type or of the closed-circuit type. In a pay television network, television programs are available only for those subscribers who have either paid a charge or fare or are willing to pay. There are two basic methods by which fees are collected. According to one method, the subscriber preliminarily subscribes to the programs which he wants to receive or watch. The other method makes use of the per program or per view billing technique. According to this method, the receiver for the pay television signal is accompanied by a charging device. In either case, the subscriber may deposit a credit in advance or pay the fare upon reception of a bill from the dealer of the pay television network. As will be understood as the description proceeds, the charging device is also useful when a subscriber preliminarily subscribes to some programs but subsequently wishes to receive a program for which subscription was not booked in advance.

The charging device displays or otherwise produces an indication of the amount of charge or fare which should either be paid or subtracted from the subscriber's credit for programs actually received at certain time instants. The subscriber reports to the dealer the amount of charge at the end of each billing period as, for example, monthly. An error may occur in the report to the dealer if the subscriber erroneously reads the display of the charge or incorrectly writes down the amount. In an extreme case, a deceitful subscriber might intentionally report only a small charge despite the display.

According to the tiering method of subscriber billing, programs are classified into tiers or categories. Codes or parameters are assigned to the respective tiers. The television signal is transmitted after being encoded or scrambled by respective codes. When the per view billing technique is applied to a tiered television network, cost information for the respective tiers must be transmitted on the television signal. This requires an additional frequency band.

SUMMARY OF THE INVENTION

It is therefore a general object of the present invention to provide a charging device for calculating the amount of money to be charged for reception of an information signal, which device is capable of avoiding errors in the report of the payable charge.

It is a specific object of this invention to provide a charging device of the type described and for use in a tiered information signal transmission network, in which it is unnecessary to transmit the information signal together with information on the cost for each tier.

It is another specific object of this invention to provide a charging device of the type described, for which no additional frequency band is necessary in a tiered information signal transmission system.

Generally speaking, the charging device according to this invention is responsive to the information signal for calculating the amount of money to be charged for reception of the information signal. The charging device is assigned a key code specific thereto and comprises charge calculating means for calculating the amount of charge representative of the amount of money required and encoding means responsive to the key code for encoding the amount of charge and the time instants of reception of the information signal into a check code.

The check code is effective in confirming, for example whether or not an error is present in the amount of charge reported by the subscriber.

According to an aspect of this invention, there is provided a charging device which is of the type generally described above and is used for an information signal which is scrambled in response to a parameter. With the parameter used to represent the fee to be charged on reception of the information signal, the charging device is equipped with parameter producing means for producing the parameter as a descrambling key for use in descrambling the information signal. The above-described charge calculating means calculates the fee in response to the descrambling key.

DESCRIPTION OF THE PREFERRED EMBODIMENTS

Figure 1:
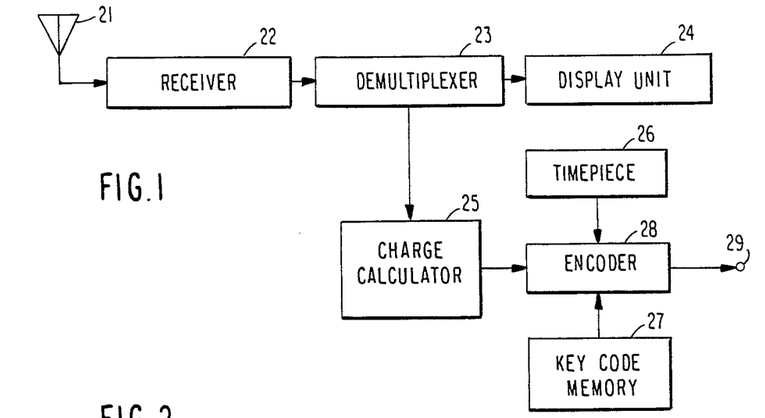
FIG. 1 is a block diagram of a charging device according to a first embodiment of the instant invention and of a television receiver comprising the charging device.

Referring to FIG. 1, the charging device according to the first embodiment of the present invention is provided for use in a television receiver of a pay television network. The charging device is used in calculating the amount of money which should be charged to the subscriber for reception of a pay television signal. It will be assumed that the television signal carries information on the amount of cost to be charged for reception during each unit time. The cost information may be multiplexed on each horizontal blanking period of the television signal.

The television signal is received at an antenna 21 and demodulated by a receiver 22. After the cost information is separated by a demultiplexer 23, the program represented by the television signal is reproduced by a display unit 24.

The charging device comprises a charge calculator 25 responsive to the cost information separated by the demultiplexer 23 for calculating the fee to be charged as will presently be described more in detail. A timepiece 26 produces a time signal indicative of time instants are covered in each billing period and may be given by year, month, and day of the month. It is to be noted here that the charging device is assigned a key code which is specific to the charging device under consideration. The key code may correspond to a serial number of the charging device. It is unnecessary that the subscriber be informed of the key code in detail. A key code memory 27 memorizes the key code. An encoder 28 encodes the amount of charge and the time instant of reception into a check code using the key code as an encoding key as will shortly be described in detail. The check code is produced at a device output terminal 29.

The subscriber is requested to report the amount of charge to the dealer of the pay television network monthly or otherwise at the end of each billing period. The report should comprise the amount of charge and the check code. The time instants may be inferred from the billing period. The key code is known to the dealer. The dealer can confirm the report by checking the reported amount of charge against the check code. By way of example, the dealer may generate a comparison check code by encoding the reported amount of the charge and the time instants, using the key code. If the report is incorrect, the check code obtained by the dealer would not coincide with the reported check code.

The reason why the time signal is used in producing the check code is as follows. The subscriber may keep records of previously reported charges. On reporting the charge at the end of a current billing period, the subscriber will keep a record of the charge to be reported. It is not unlikely that the subscriber may inadvertently report one of the previously recorded charges. If only the amount of such charge is encoded, the dealer would be incapable of finding this inadvertent error of the subscriber.

Figures 2, 3:
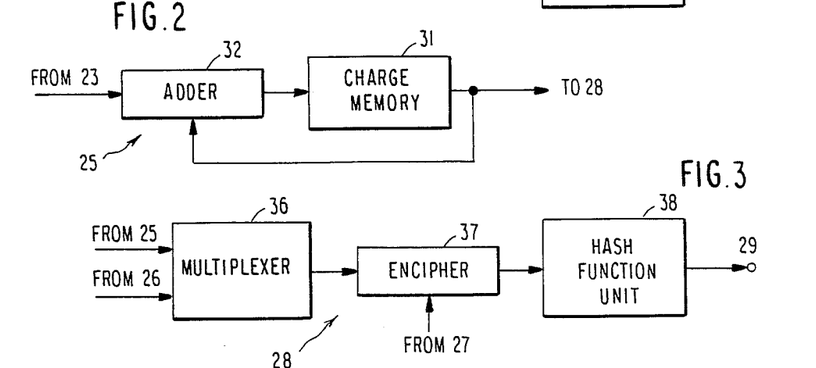
FIG. 2 is a block diagram of a charge calculator for use in the charging device depicted in FIG. 1.
FIG. 3 is a block diagram of an encoder for use in the charging device illustrated in FIG. 1.

Turning to FIG. 2, the charge calculator 25 may comprise a charge memory 31 for storing the amount of charge. The cost information is delivered from the demultiplexer 23 to an adder 32. As described heretobefore, the cost information indicates the fee per each unit time of reception. The adder 32 calculates the sum of the fee and the content of the charge memory 31 after each unit time has elapsed and forwards the sum to the charge memory. The content of the charge memory is fed to the encoder 28. The charge memory 31 may be reset by a specific signal supplied by the dealer.

Turning to FIG. 3, the encoder 28 may comprise a multiplexer 36 for multiplexing the amount information delivered from the charge calculator 25 and the time signal fed from the timepiece 26. The mutlplexer 36 supplies an encipher 37 with a multiplexed signal. By using the key code delivered from the key code memory 27 as the enciphering key, the encipher 37 converts the multiplexed signal into an enciphered signal. It is possible to directly use the enciphered signal as the above-mentioned check code.

The encoder 28 may further comprise a hash function unit 38 for producing the check code from the enciphered signal. The hash function unit 38 converts the enciphered signal into a code of a siren code length, such as sixteen bits, which may be conveniently handled. The hash function unit 38 may pickup sixteen less significant digits of the enciphered signal. Alternatively, the hash function unit 38 may divide the enciphered signal by a prime number of sixteen bits and produce a remainder as the check code. It is possible to implement the hash function unit 38 with either a register or a divider (quotient calculator).

Returning to FIG. 1, the charging device may dispense with the timepiece 26 if the time signal is carried by the television signal and separated from the television signal by the demultiplexer 23. The horizontal blanking periods may also be used for this purpose. The display unit 24 may be used to display the amount of charge calculated by the charge calculator 25 whenever the subscriber wants to see the amount. As will be described in the following, the charging device may comprise a control switch for switching the charge calculator 25 into and out of operation concurrently with the television receiver.

Figure 4:
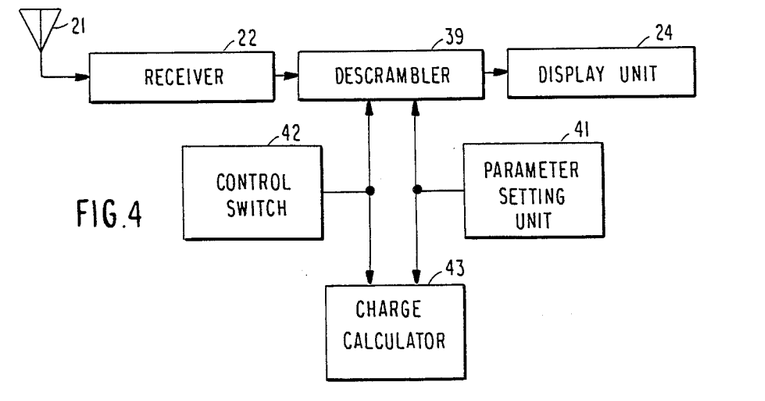
FIG. 4 is a block diagram of a charging device according to a second embodiment of this invention and of a television receiver comprising the charging device.

Referring now to FIG. 4, a charging device according to a second embodiment of this invention comprises similar parts designated by like reference numerals. It will now be assumed that the programs served by the pay television signal are divisible into first through n-th tiers according to the cost per unit time. The amounts will be designated as first through n-th costs $r_1, r_2, \ldots, r_n$ for the first through the n-th tiers, respectively. Video and audio signals of the first through the n-th tiers are scrambled in the television signal by first through n-th parameters or codes $K_1, K_2, \ldots,$ and $K_n$ assigned to the respective tiers. The words "scrambling" and "enciphering" are used merely for convenience of description and are indicative of the process called "encryption" in a Jan. 15, 1977 publication of the National Bureau of Standards of the entitled "Data Encryption Standard" (Federal Information Processing Standards Publication No. 46). It should be noted in connection with the charging device being illustrtated that the parameters $K_1$ through $K_n$ are used to represent the respective costs $r_1$ through $r_n$.

In FIG. 4, the television receiver need not comprise a demultiplexer 23 (FIG. 1) but comprises a descrambler 39 for descrambling the television signal demodulated by the receiver 22. For this purpose, the subscriber sets on a parameter setting unit 41 an i-th parameter Ki (i being one of 1 through n) as a descrambling key in compliance with the tier of the program which he wants to watch. The parameter setting unit 41 serves as a parameter producing unit and may have at least n push buttons (not shown). The subscriber may select one of the push buttons on setting the i-th parameter on the parameter setting unit 41. It is convenient to understand that the parameter setting unit 41 serves as a part of the charging device.

A control switch 42 switches the descrambler 39 into and out of operation. When the control switch 42 is switched on, the descrambler 39 descrambles the television signal in response to the descrambling key to make the display unit 24 display the desired program. At the same time, charge calculator 43 is put into operation. Responsive to the parameter or descrambling key delivered from the parameter setting unit 41, the charge calculator 43 calculates the amount of charge.

The control switch 42 may be a push button and may be used as a power source switch of the television receiver. The parameter setting unit 41 may be automatically operable by automatic tuning. Although not depicted, the encoder 28 (FIG. 1) is preferably used in encoding the amount of charge and the time instants into the check code.

Figure 5:
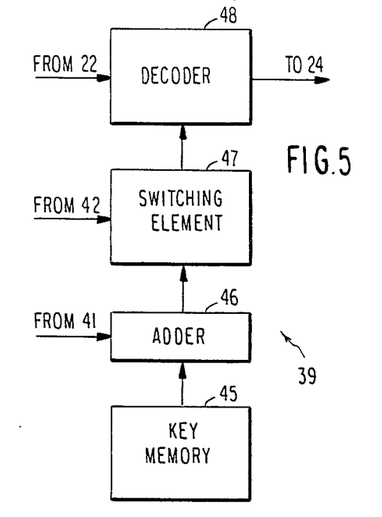
FIG. 5 is a block diagram of a descrambling unit for use in the charging device shown in FIG. 4.

Turning to FIG. 5, it will be presumed that the descrambler 39 is for a pay television signal which is scrambled in response to a parameter or code given by the sum of a predetermined key K and an integer i indicative of the i-th parameter Ki. A key memory 45 memorizes the predetermined key K. The parameter setting unit 41 (FIG. 4) supplies the integer i to an adder 46, which calculates the sum of the predetermined key K and the integer i to produce the i-th parameter Ki. A switching element 47 is controlled by the control switch 42. When the control switch 42 is on, the switching element 47 delivers the i-th parameter Ki from the adder 46 to a decoder 48 for use as the descrambling key in descrambling the television signal demodulated by the receiver 22. The decoder 48 delivers a descrambled signal to the display unit 24.

In place of the sum of the predetermined key K and the integer i, it is possible to define the i-th parameter Ki as a function of two terms given by the predetermined key K and an integer i. For example, the function may be the Exclusive OR. The integer i may be one of first through n-th natural numbers preselected for the first through the n-th parameters K1 to Kn.

Figure 6:
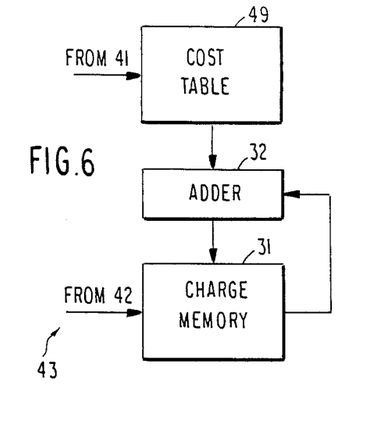
FIG. 6 is a block diagram of a charging unit for use in the charging device illustrated in FIG. 4.

Further turning to FIG. 6, the charge calculator 43 may comprise a cost table 49 for memorizing first through n-th costs $r_1$ to $r_n$. Responsive to the parameter Ki delivered from the parameter setting unit 41, the cost table 49 produces that one of the costs $r_1$ through $r_n$ that is indicated by the parameter Ki. The charge memory 31 is controlled by the control switch 42 so as to store the sum calculated by the adder 32 only when the control switch 42 is switched on. Alternatively, an enabling switch (not shown) may be interposed between the charge memory 31 and the adder 32 as will later be described. The enabling switch is enabled, like the switching element 47 (FIG. 5), to store the sum in the charge memory 31 only when the control switch 42 is rendered on. The charge calculator 43 is similar in other respects to the charge calculator 25 illustrated with reference to FIG. 2. It will be understood that the first through the n-th costs $r_1$ to $r_n$ need not be represented directly by the first through the n-th parameters K1 to Kn but may merely be defined thereby.

Figure 7:
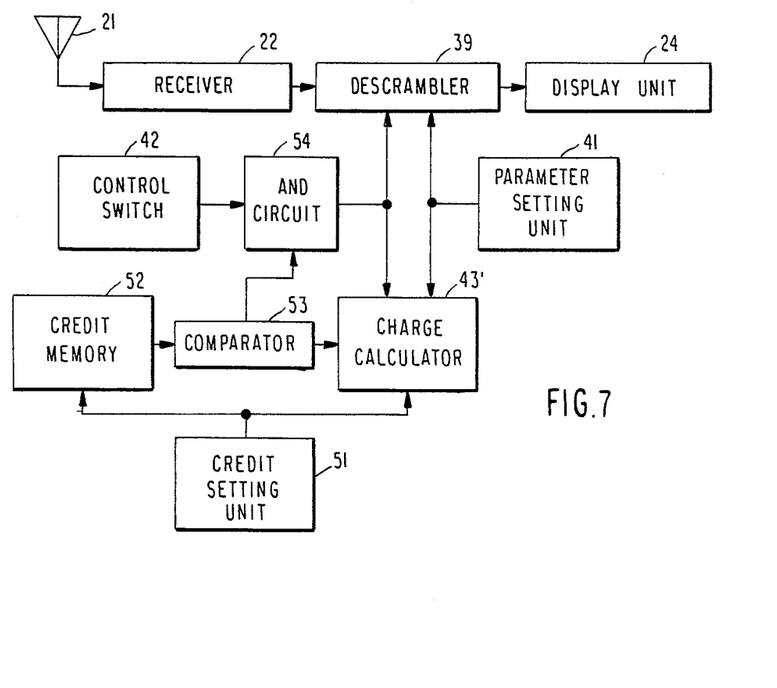
FIG. 7 is a block diagram of a charging device according to a third embodiment of this invention and of a television receiver comprising the charging device.

Referring to FIG. 7, a charging device according to a third embodiment of this invention comprises similar parts which are again designated by like reference numerals. The charging device comprises a credit setting unit 51 for setting the amount of credit which is paid in advance to the dealer of the pay television network at the beginning of each billing period. Although not depicted in detail, the credit setting unit 51 may comprise an array of push buttons operable by the subscriber in accordance with the amount of credit which he wishes to deposit. Alternatively, the credit setting unit 51 may be a card reader for reading the credit card of the subscriber.

In FIG. 7, the charge calculator is indicated at 43'. This is because the charge calculator 43' is a little different from the charge calculator 43 (FIGS. 5 and 6) as will presently become clear. A credit memory 52 memorizes the amount of credit set by the credit setting unit 51. A comparator 53 compares the amount of credit memorized in the credit memory 52 with the amount of charge calculated by the charge calculator 43'.

Figure 8:
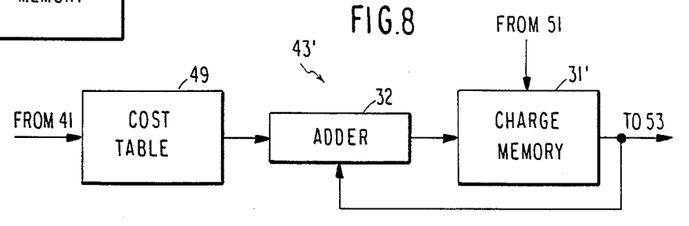
FIG. 8 is a block diagram of a charging unit for use in the charging device depicted in FIG. 7.

Turning to FIG. 8, the charge calculator 43' is similar in structure to that illustrated with reference to FIG. 6. A charge memory 31' has a reset terminal through which the content representative of the amount of charge is reset to zero when a new credit is set by the credit setting unit 51. The content is delivered to the comparator 53.

Turning back to FIG. 7, the comparator 53 produces a control signal indicative of whether or not the amount of charge exceeds the amount of credit memorized in the credit memory 52. The control signal is delivered to a control AND circuit 54 which is enabled only when the control switch 42 is rendered on. The control AND circuit 54 supplies the control signal to the descrambler 39 and to the charge calculator 43'. Only when the control signal indicates that the amount of charge does not exceed the amount of credit, the descrambler 39 carries out the descrambling operation on the television signal demodulated by the receiver 22. The descrambling operation is suspended when it is indicated by the control signal that the amount of charge exceeds the amount of credit. In this event, operation of the charge calculator 43' is also suspended.

Figure 9:
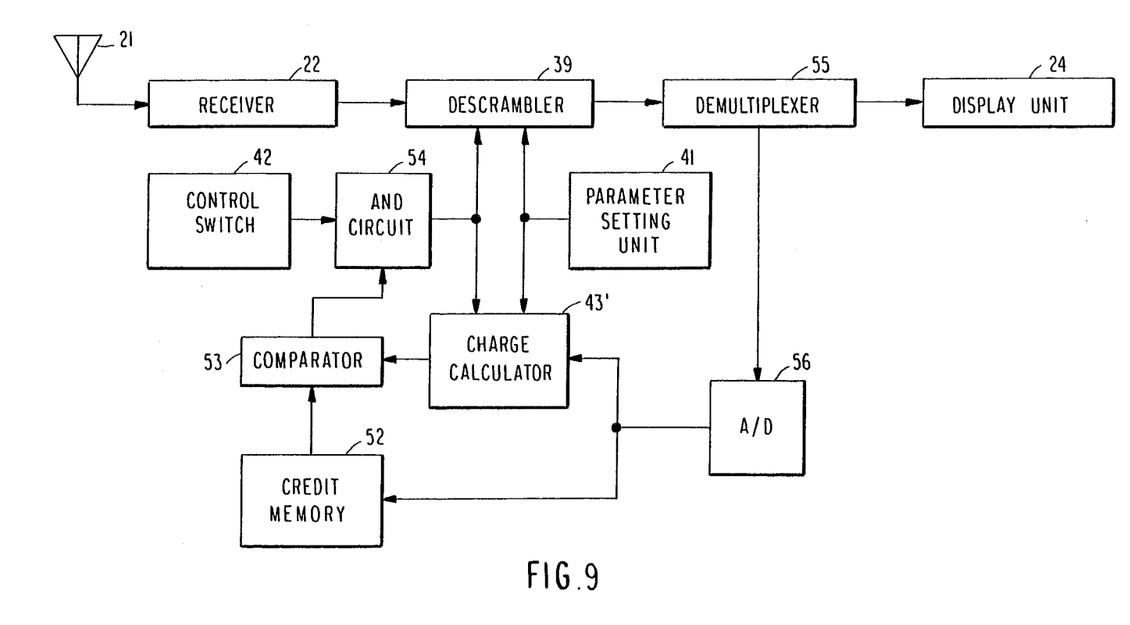
FIG. 9 is a block diagram of a charging device according to a fourth embodiment of this invention and of a television receiver comprising the charging device.

Referring to FIG. 9, a charging device according to a fourth embodiment of this invention is similar to that illustrated with reference to FIG. 7. The amount of credit is, however, not set by the credit setting unit 51 (FIG. 7) but is delivered on the pay television signal as an analog signal. The analog signal is encoded into an encoded signal by an encoding key which is specific to the charging device in question. The encoded signal may be multiplexed on one of the vertical blanking periods.

A demultiplexer 55 demultiplexes the analog signal, from the television signal which has been either demodulated by the receiver 22 or descrambled by the descrambler 39. The analog signal is delivered from the demultiplexer 55 to an A/D (analog-to-digital) converter 56, which produces a digital output indicative of the amount of credit carried by the pay television signal and stores the same in the credit memory 52. The amount of credit produced by the A/D converter 56 is used to reset the amount of charge kept in the charge calculator 43'. The charging device of FIG. 9, is similar in other respects to the charging device illustrated with reference to FIG. 7.

Figure 10:
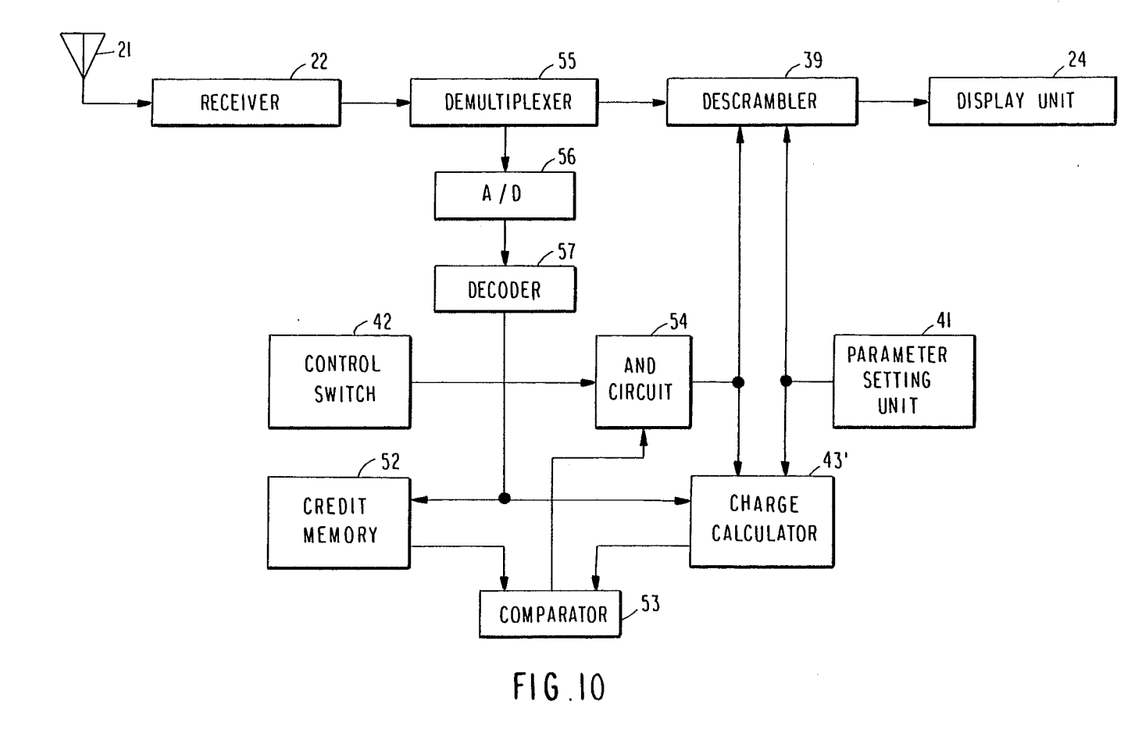
FIG. 10 is a block diagram of a charging device according to a fifth embodiment of this invention and of a television receiver comprising the charging device.

Referring to FIG. 10, a charging device according to a fifth embodiment of this invention is similar to that illustrated with reference to FIG. 9. The amount of credit is, however, digitally scrambled by an encoding key specific to the charging device, thereafter converted to an analog signal, and then multiplexed on the pay television signal. The charging device therefore comprises a credit amount decoder 57 in addition to the circuit elements described in conjunction with FIG. 9. The credit amount decoder 57 decodes the digitally scrambled amount of credit. Instead of A/D converter 56, the credit amount decoder 57 is used to store the amount of credit in the credit memory 52 and to reset the amount of charge in the charge calculator 43'.

Figure 11:
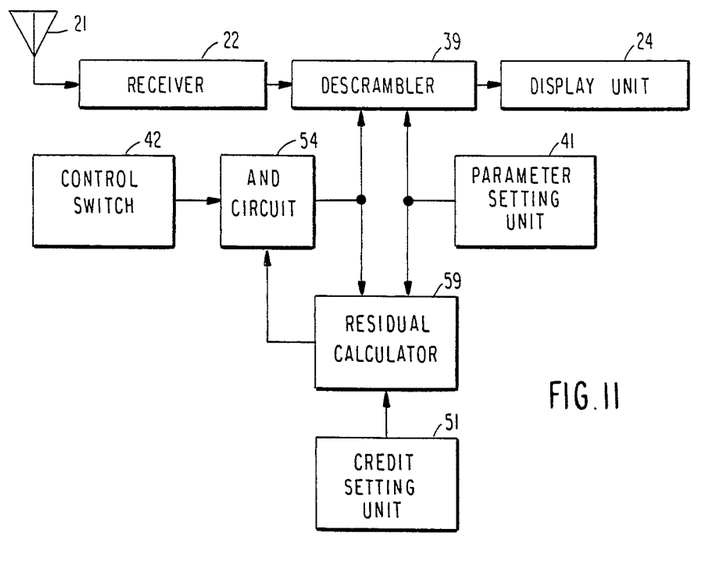
FIG. 11 is a block diagram of a charging device according to a sixth embodiment of this invention and of a television receiver comprising the charging device.

Referring to FIG. 11, a charging device according to a sixth embodiment of this invention is similar to that illustrated with reference to FIG. 7. Similar parts are designated once more by like reference numerals. In place of the charge calculator 43', the charging device comprises a residual calculator 59 which comprises parts corresponding to the credit memory 52 and the comparator 53 and calculates the residual amount of credit as will shortly be described in more detail. Like the control signal produced by the charge calculator 43', a discrimination signal is produced by the residual calculator 59 to indicate whether or not the residual amount of credit is positive. Responsive to the discrimination signal, the control AND circuit 54 suspends the descrambling operation of the descrambler 39 when the residual amount of credit becomes negative.

Figure 12:
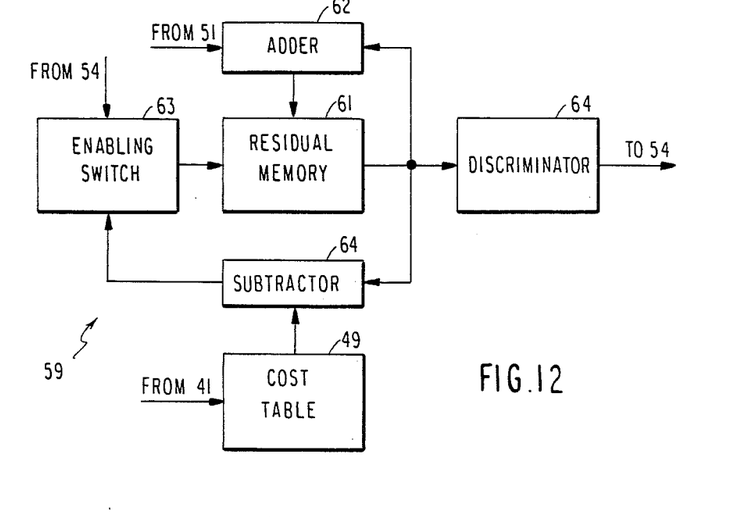
FIG. 12 is a block diagram of a residual amount calculator for use in the charging device shown in FIG. 11.

Turning to FIG. 12, the residual calculator 59 may comprise a residual memory 61, the content of which is added by adder 62 to the amount of credit supplied from the credit setting unit 51 to produce a sum. The sum replaces the original content of memory 61. The cost table 49 is that described in connection with FIG. 8. An enabling switch 63 is switched on when the control AND circuit 54 is supplied with the discrimination signal which indicates that the residual amount of credit is positive. A subtractor 64 reduces the content of the residual memory 61 by that cost which is delivered from the cost table 49 at the lapse of each unit of time. The content of the residual memory 61 is renewed with the difference value while the enabling switch 63 will be rendered on. It is understood that the residual memory 61 maintains the above-mentioned residual amount of credit. A discriminator 65 discriminates whether or not the residual amount of credit is positive. The discriminator 65 thereby produces the above-described discrimination signal.

When the amount of charge is used in place of the residual amount of credit, it is possible to understand that the residual calculator 59 illustrated with reference to FIG. 12 is as follows. The residual memory 61 serves as an integrator for integrating the descrambling key Ki to produce an integration or summation of the charges. The subtractor 64 serves to subtract the integration from the amount of credit to produce the residual amount of credit.

Reviewing FIGS. 7, 9, 10, and 11, it will be clear that the charging devices illustrated with reference thereto should preferably comprise the encoder 28 (FIG. 1) for encoding either the amount of charge or the residual amount of credit and the time instant signal to produce the check code. The charging device illustrated with reference to FIG. 11 may be modified as described in conjunction with FIGS. 9 and 10.

Figure 13:
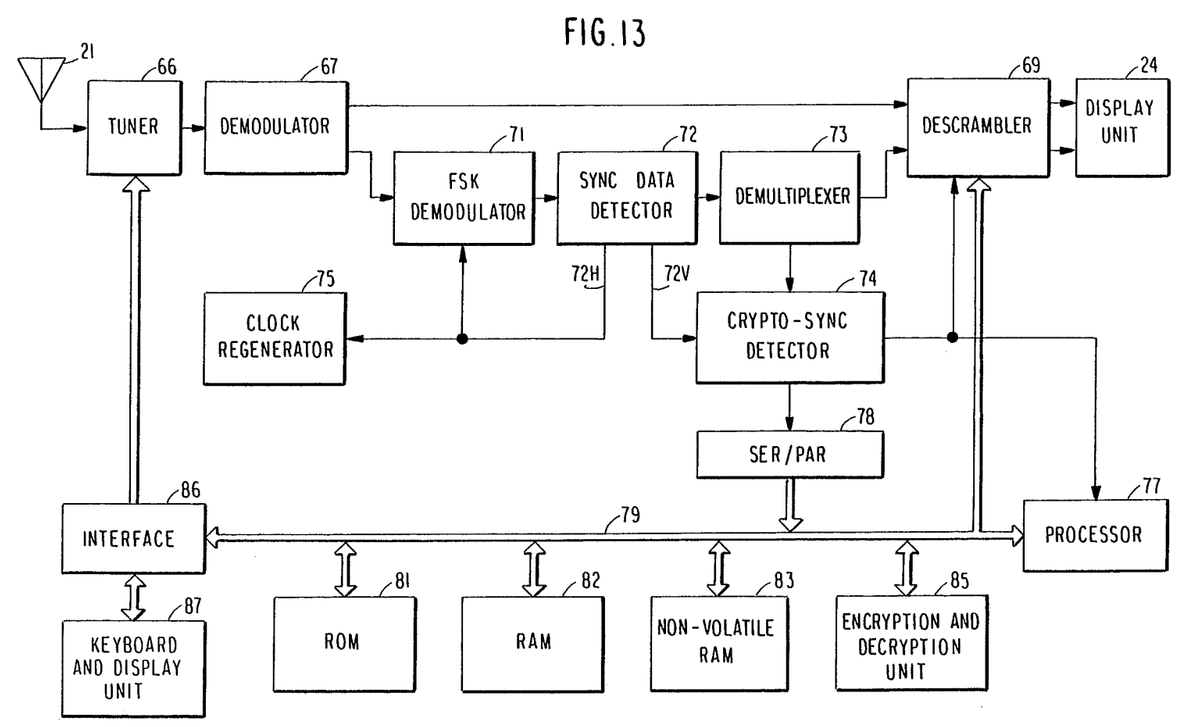
FIG. 13 is a block diagram of a charging device according to a seventh embodiment of this invention and of a television receiver comprising the charging device.

Referring now to FIG. 13, a charging device according to a seventh embodiment of this invention is for use in combination with a television receiver for the C-MAC system described by H. Mertens et al in EBU Review, No. 200 (August 1983), pages 172–185, under the title "The C-MAC/Packet System for Direct Satellite Television". Briefly speaking as regards each scanning line, the television signal comprises a video signal and various data which are PSK (phase-shift keying) modulated and multiplexed. The data comprise synchronization data, audio data, and control data. As will presently be described in more detail, the control data for a plurality of scanning lines are collected and formatted to form a control data block.

The television receiver is connected to an antenna 21 and comprises a display unit 24 as has thus far been described. Although not mentioned before, the display unit 24 also comprises a loudspeaker. A tuner 66 selects one of the television channels for reception in a manner which will later become clear. The television signal selected by the tuner 66, is demodulated by a demodulator 67 into the video signal and various data from which the synchronization, the audio, and the control data are separated as will presently be described. In the manner later described in detail, a descrambler 69 descrambles the video signal and the audio data for reproduction by the display unit 24.

Figure 14:
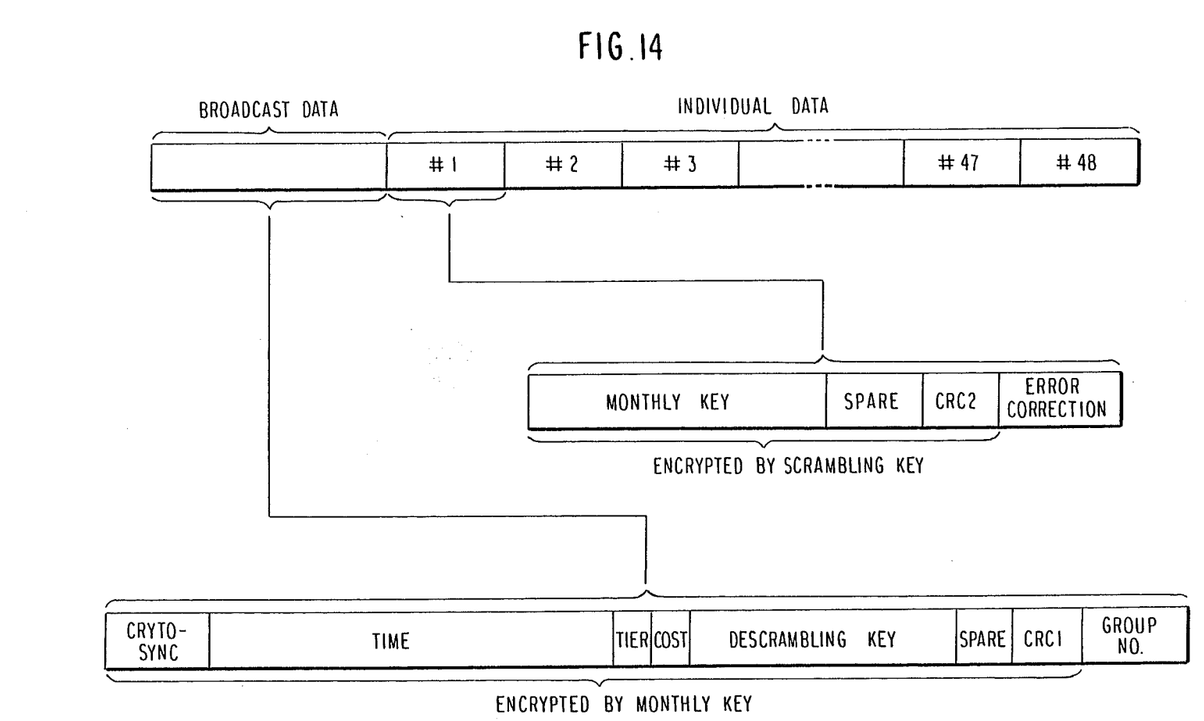
FIG. 14 shows the format of a block of control data for use in the television receiver depicted in FIG. 13.

Turning temporarily to FIG. 14, a control data block is depicted with the assumption that three bits are allotted to each scanning line, that a frame is formed of 525 scanning lines, and that each control data block contains the control data for four frames. The control data block comprises a broadcast data field of 252 bits and first through forty-eighth individual data fields, each of 126 bits. The individual data fields are identified by identification numbers, which may be serial numbers, such as 1 through 48.

The broadcast data field comprises an encryption synchronization data area of 24 bits, a time data area of 96 bits, a tier data area of 8 bits, a cost data area of 8 bits, a descrambling key data area of 64 bits, a CRC1 data area of 16 bits, a group number data area of 24 bits, and a spare area of 12 bits. Each individual data field comprises a monthly key data area of 64 bits, a CRC2 data area of 16 bits, an error correction code area of 26 bits, and a spare area of 20 bits. The monthly key data of the monthly key data area are changed from month to month.

In the broadcast data field, signals of the time data, the tier data, the cost data, the descrambling key data, and the CRC1 data are encrypted by the monthly key given by the monthly key data. In each individual data field, signals of the monthly key data and the CRC2 data are encrypted by the descrambling key data used as a scrambling key. If used, signals of the spare areas of the broadcast data field and of each individual data field are encrypted by the monthly key and the scrambling key.

Turning back to FIG. 13, a PSK demodulator 71 derives the control data blocks from the demodulated television signal. The PSK demodulator 71 may be a noncoherent detector as described for a binary FSK signal in book "Communication Systems" written by A. Bruce Carlson and published by McGraw-Hill et al. In the second edition of the book, the noncoherent detector is depicted in FIG. 10.16 on page 398.

A synchronization data detector 72 produces horizontal and vertical synchronizing pulses to horizontal and vertical synchronization lines 72H and 72V, respectively. The horizontal synchronizing pulses are fed back to the PSK demodulator 71 for use in deriving the control data blocks. A demultiplexer 73 separately supplies the audio data to the descrambler 69 and the control data to an encryption-synchronization data detector 74. Responsive to the horizontal synchronization pulses, a clock regenerator 75 regenerates clock pulses for use in the manner known in the art.

Responsive to the vertical synchronizing pulses and the control data supplied through the vertical synchronization line 72V and from the demultiplexer 73, the encryption-synchronization data detector 74 detects the encryption-synchronization data to deliver an output pulse to the descrambler 69 and to a processor 77. The control data are delivered further to a serial-to-parallel converter 78 for supplying eight-bit parallel control data to a data bus 79, which is connected to the descrambler 69, the processor 77, a read-only memory 81, a random access memory 82, a non-volatile random access memory 83, an encryption and decryption unit 85, and an interface circuit 86. A keyboard and display unit 87 accompanies the interface circuit 86.

The tuner 66, the demodulator 67, the descrambler 69, the interface circuit 86, and the keyboard and display unit 87 may be the tuner, the demodulator for the video and the audio signals, a combination of the video and the audio decoders, the interface, and the keyboard and display unit described in the specification of International Application Publication No. WO 83/04154 published under the Patent Cooperation Treaty. The inventors are Robert S. Block et al. The applicant is Telease, Inc., of Los Angeles, Calif. The interface circuit 86 interfaces the keyboard and display unit 87 and moreover delivers a channel selection signal to the tuner 66.

As for the encryption and decryption unit 85, reference should be had, if desired, to a publication published April 1981 by Advanced Micro Devices, Inc., Sunnyvale, Calif., under the number AmZ8068. More particularly, a block diagram is shown on page 2 of the publication for a data ciphering processor. On using the data ciphering processor as an encryptor, an encrypting key is set in the E key register of the block diagram. Through the master port, data are supplied to the mode register so as to make the bits M2, M3, and M4 take binary values zero, one, and one, respectively. When data are thereafter supplied to the master port for encryption, the data are stored in the input register, encrypted in the algorithm unit, and produced through the output register back to the master port. On using as a decryptor, a decrypting key is set in the D key register. The bits M2, M3, and M4 are made to take binary values zero, one, and zero, respectively. Data thereafter supplied through the master port for decryption, are likewise processed and produced back through the master port.

Figure 15:
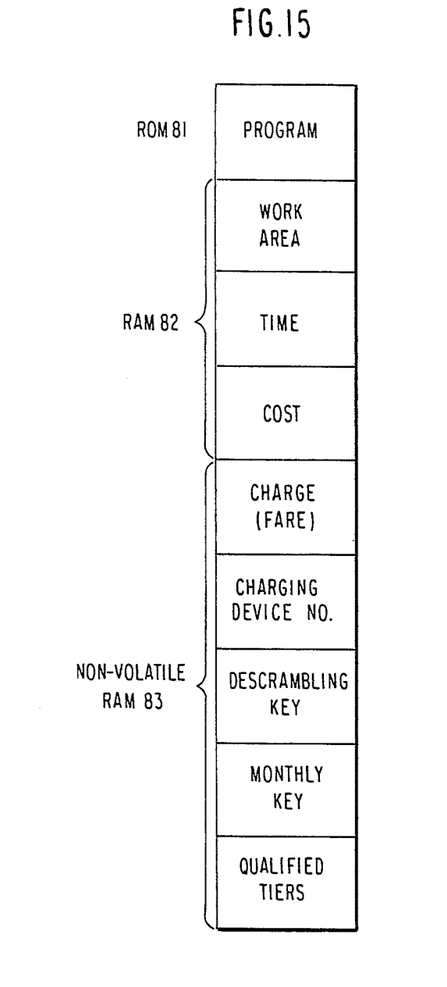
FIG. 15 is a memory map for the charging device depicted in FIG. 13.

Turning to FIG. 15, the read-only memory 81 memorizes the program read by and used by the processor 77. The random access memory 82 has a work area and memory areas for the time data and the cost data. The non-volatile random access memory 83 has memory areas for the charge or fare data, the number given to the charging device, the encrypting key, the decripting key, and tiers for which either the subscriber has subscribed in advance as qualified tiers or which can be received by the per view billing technique as pay per view tiers. The number given to the charging device is represented by a combination of the group number data of 24 bits and an individual number datum which indicates the serial number of the individual fields by 6 bits.

Figure 16A:
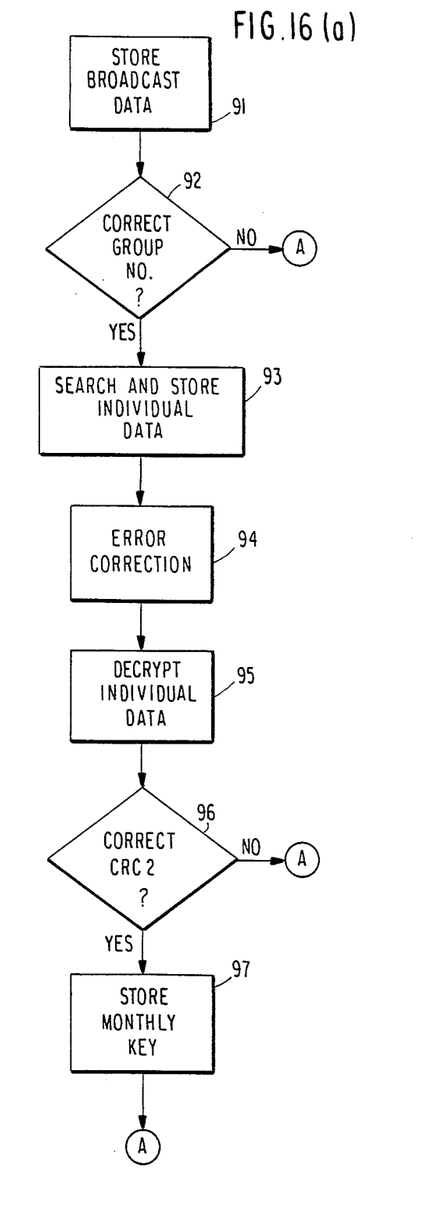
FIGS. 16(a) and (b) show a flow chart for use in describing the operation of a processor used in the charging device illustrated in FIG. 13.
Figure 16B:
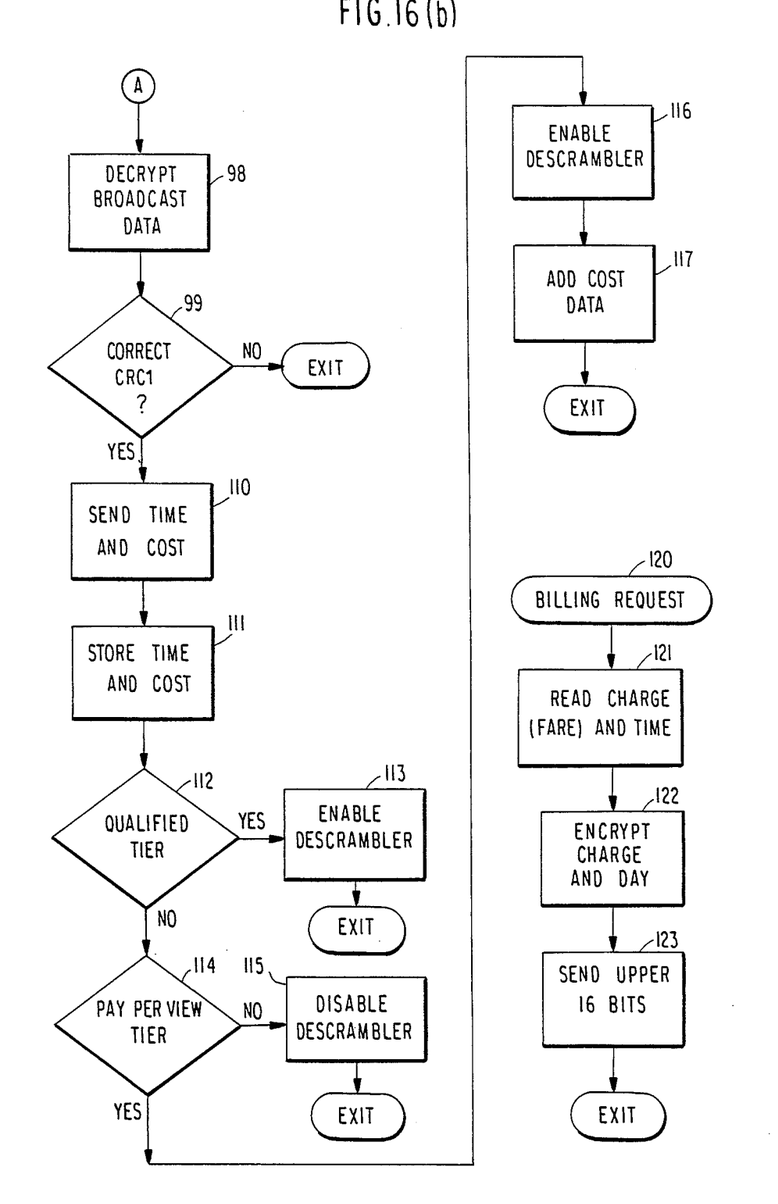

Referring to FIG. 16 in addition to FIGS. 13 through 15, the processor 77 receives the parallel control data from the serial-to-parallel converter 78 through the data bus 79. In compliance with the program read from the read-only memory 81, the processor 77 loads the random access memory 82 at a first step 91 with those data of the broadcast data field other than the encryption-synchronization data and the group number data. The processor 77 refers to the non-volatile random access memory 83 at a second step 92 as regards the group number data to check whether or not the group number data are correct in the broadcast data field.

If the group number data are correct, the processor 77 searches at a third step 93 the individual data field which is assigned to the charging device being illustrated. The search is carried out with reference to the individual number datum kept in the non-volatile random access memory 83. The processor 77 loads the random access memory 82 with the individual data included in the individual data field. At a fourth step 94, the processor 77 corrects the errors, if any, in the individual data using the error correction code. Using the decrypting key of the non-volatile random access memory 83, the processor 77 makes the encryption and decryption unit 85 decrypt the individual data into decrypted individual data at a fifth step 95 and stores the decrypted individual data again in the random access memory 82. While storing the descrypted individual data in the random access memory 82, the processor 77 calculates the CRC2 data at a sixth step 96 and checks whether the calculated datum is correct. If correct, the processor 77 stores at a seventh step 97 the monthly key data in the non-volatile random access memory 83 as a monthly key for the next month.

At an eighth step 98, the processor 77 makes the encryption and decryption unit 85 decrypt the broadcast data stored in the random access memory 82 into decrypted broadcast data. The decryption is carried out by the use of the monthly key retained in the non-volatile random access memory 83 for the current month. At the same time, the processor 77 stores the decrypted broadcast data again in the random access memory 82. While storing the decrypted broadcast data, the processor 77 calculates the CRC1 data at a ninth step 99 to check whether the calculated datum is correct. If correct, the processor 77 sends the time data at a tenth step 110 to the keyboard and display unit 87. At the same time, the processor 77 sends the descrambling key to the descrambler 69. At an eleventh step 111, the processor 77 stores the time data and the cost data in the memory areas of the random access memory 82.

At a twelfth step 112, the processor 77 checks whether or not the tier stored in the random access memory 82 is one of the qualified tiers kept in the non-volatile random access memory 83. If so, the processor 77 makes the descrambler 69 carry out the descrambling operation at a thirteenth step 113 by the use of the encryption-synchronization pulse produced by the encryption-synchronization data detector 74 and the descrambling key stored in the non-volatile random access memory 83. If not, the processor 77 checks at a fourteenth step 114 if the tier stored in the random access memory 82 is one of the pay per view tiers held in the non-volatile random access memory 83. If not, the processor 77 suspends the descrambling operation at a fifteenth step 115. If the tier stored in the random access memory 82 is one of the pay per view tiers, the processor 77 makes the descrambler 69 carry out the descrambling operation at a sixteenth step 116. In this event, the processor 77 adds the cost data stored in the random access memory 82 at a seventeenth step 117 to the charge (fare) data in the non-volatile random access memory 83.

Billing is carried out as follows. The subscriber uses the keyboard and display unit 87 on initiating the billing request as indicated at 120. In compliance with the program memorized in the read-only memory 81, the processor 77 reads at a first step 121 of the billing operation the charge from the non-volatile random access memory 83 and the dates among the time data stored in the random access memory 82. At a second step 122, the processor 77 makes the encryption and decryption unit 85 encrypt the charge and the date data into a check code of the above-mentioned type by the use of the encrypting key kept in the non-volatile random access memory 83. At a third step 123 of billing, the processor 77 makes the keyboard and display unit 87 display the sixteen more significant digits of the check code.

Reviewing FIG. 14, the broadcast data field may be dispensed with the cost data area with the spare area widened to an area length of 20 bits. Under these circumstances, the cost data are stored by the subscriber from the keyboard and display unit 87 in the memory area of the random access memory 82. The key used by the processor 77 in making the encryption and decryption unit 85 decrypt the broadcast data, is given by the bit by bit Exclusive OR of the monthly key and the cost data.

Again reviewing FIG. 14, the individual data field may be modified to include credit data of 10 bits in the spare area. In this event, the processor 77 adds in the non-volatile random access memory 83 the credit data to the charge (fare) memorized therein. In FIG. 16, the processor 77 stores in the non-volatile random access memory 83 at the sixteenth step 116 the difference of the charge minus the cost data. The descrambling operation may be suspended at the thirteenth step 113 or the fifteenth step 115 if the difference is not positive. Furthermore, the processor 77 carries out the billing operation by reading the charge (fare) at the first step 121 and sending the charge to the keyboard and display unit 87 for display at the second step 122.

Figures 17, 18:
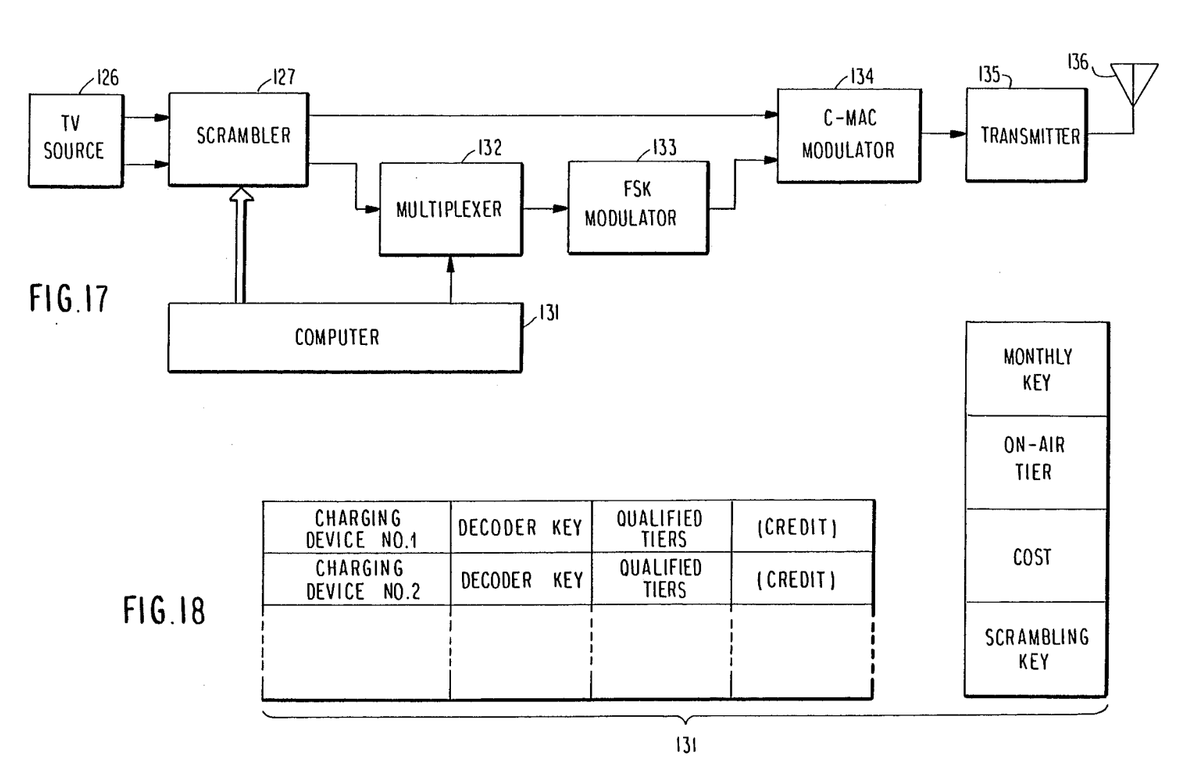
FIG. 17 is a block diagram of a television transmitter for use in a pay television network comprising a charging device shown in FIG. 13.
FIG. 18 shows data to be memorized in the computer used at the television transmitter.

Referring now to FIG. 17, a television transmitter for transmitting the pay television signal to the television receiver is illustrated with reference to FIG. 13. A television source 126 generates a television signal comprising a video and an audio signal. A scrambler 127 scrambles the video and the audio signals under the control of a computer 131 into scrambled video and audio signals.

Turning to FIG. 18, the computer 131 has a table for keeping track of each of the subscribers, the charging device numbers 1, 2, . . . , decoder keys, and qualified tiers. For each qualified tier, the table may hold the amount of credit paid in advance. Common to the subscribers, the table retains the monthly key, the tier of the on-air program, the cost therefor, and the scrambling key.

Turning back to FIG. 17, the video and the audio signals are scrambled in the scrambler 127 by the use of the scrambling key. A multiplexer 132 time-division multiplexes the control data and the synchronization data on the scrambled audio signal. The format of the control data is similar to that described with reference to FIG. 14. The time-division multiplexed audio and other data are modulated by an PSK modulator 133. A C-MAC modulator 134 modulates the scrambled video signal and the audio and other data according to the C-MAC system. A transmitter 135 transmits the C-MAC modulated signal through a transmission antenna 136. The PSK modulation technique is described in the above-referenced book of A. Bruce Carlson. The scrambler 127 and the transmitter 135 may be those described in the above-cited specification of International Application Publication No. WO 83/04154.

Reviewing FIGS. 13 through 18, various other modifications are possible. As described in conjunction with FIG. 1, the display unit 24 may be used in displaying the data displayed by the keyboard and display unit 87. The control data may be multiplexed on the horizontal blanking periods. The format of the control data block is not restricted to that described with reference to FIG. 14. It is possible to correct the errors by hardware. Although it is preferred to carry out encryption and decryption according to the above-mentioned Publication No. 46 of the National Bureau of Standards, other schemes may be used and even implemented by software. The charging device number and the descrambling key may be kept in the read-only memory 81 rather than in the non-volatile random access memory 83. As described in connection with FIG. 5, various functions may be substituted for the bit by bit Exclusive OR.

While this invention has thus far been described as regards a pay television network, it will be readily possible for one skilled in the art to manufacture and use the charging device in an information signal transmission network. For example, the information signal may be for audio programs.

I claim:

1. A charging device responsive to an information signal for calculating a fee to be charged for reception of said information signal, said charging device being assigned a key code specific thereto, comprising; charge calculating means for calculating an amount representative of said fee and encoding means responsive to said key code for encoding said amount and a time instant when calculation of said amount is completed, to form a check code.

2. A charging device as claimed in claim 1, wherein said encoding means comprises a timepiece for producing a time signal indicative of each time instant, a key code memory for memorizing said key code as an enciphering key, and an encipher responsive to said enciphering key for enciphering said amount and said time signal to form said check code.

3. A charging device as claimed in claim 1, wherein said encoding means comprises a timepiece for producing a time signal indicative of each time instant, a key code memory for memorizing said key code as an enciphering key, an encipher responsive to said enciphering key for enciphering said amount and said time signal into an enciphered signal, and a hash function unit responsive to said enciphered signal for producing said check code.

4. A charging device as claimed in claim 1, said information signal including a time signal indicative of each time instant, wherein said encoding means comprises a key code memory for memorizing said key code as an enciphering key and an encipher responsive to said enciphering key for enciphering said amount and said time signal to form said check code.

5. A charging device as claimed in claim 1, said information signal including a time signal indicative of each time instant, wherein said encoding means comprises a key code memory for memorizing said key code as an enciphering key, an encipher responsive to said enciphering key for enciphering said amount and said time signal into an enciphered signal, and a hash function unit responsive to said enciphered signal for producing said check code.

6. A charging device as claimed in claim 1, said information signal being scrambled in response to a parameter which defines the fee to be charged on reception of said information signal, wherein said charging device further comprises parameter producing means for producing said parameter as a descrambling key for use in descrambling said information signal, said charge calculating means being responsive to said descrambling key for calculating said amount.

7. A charging device as claimed in claim 6, said parameter being selected from a plurality of parameters, wherein said charging calculating means comprises table means for memorizing the fee associated with each of said plurality of parameters, respectively, selecting means for selecting one of said fees, and means responsive to said selected fee for calculating said amount.

8. A charging device as claimed in claim 6, wherein said charging device further comprises credit memory means for memorizing a credit amount, said charge calculating means being further responsive to said credit amount for calculating said amount while said amount does not exceed said credit amount.

9. A charging device as claimed in claim 8 and for use in combination with descrambling means responsive to said descrambling key for carrying out a descrambling operation on said information signal, wherein said charging device further comprises control means responsive to said amount for controlling said descrambling means to suspend said descrambling operation when said amount tends to exceed said credit amount.

10. A charging device as claimed in claim 9, wherein said control means comprises a comparator for comparing said amount with said credit amount to produce a control signal indicative of whether or not said amount exceeds said credit amount, and means for supplying said control signal to said descrambling means to suspend said descrambling operation when said control signal indicates that said amount exceeds said credit amount.

11. A charging device as claimed in claim 9, wherein said charge calculating means comprises integrating means for integrating said amount to produce an integrated charge, subtracting means for subtracting said integrated charge from said credit amount to produce a residual credit, and discriminating means for discriminating said residual credit to produce a discrimination signal which serves as said control signal and which indicates whether or not said residual credit is positive, said integrated charge representing said amount while said discrimination signal indicates that said residual credit is positive.

* * * * *

UNITED STATES PATENT AND TRADEMARK OFFICE
CERTIFICATE OF CORRECTION

PATENT NO. : 4,796,297

DATED : January 3, 1989

INVENTOR(S) : Okamoto

It is certified that error appears in the above-identified patent and that said Letters Patent is hereby corrected as shown below:

Column 4, line 15, delete "mutlplexer: and insert --multiplexer--;

Column 9, line 66, delete "decripting" insert --decrypting--;

Signed and Sealed this

Twenty-second Day of August, 1989

Attest:

DONALD J. QUIGG

*Attesting Officer*      *Commissioner of Patents and Trademarks*